United States Patent Office 3,618,503
Patented Nov. 9, 1971

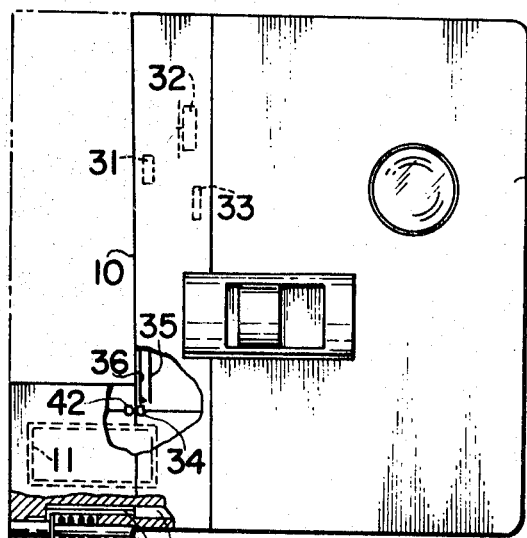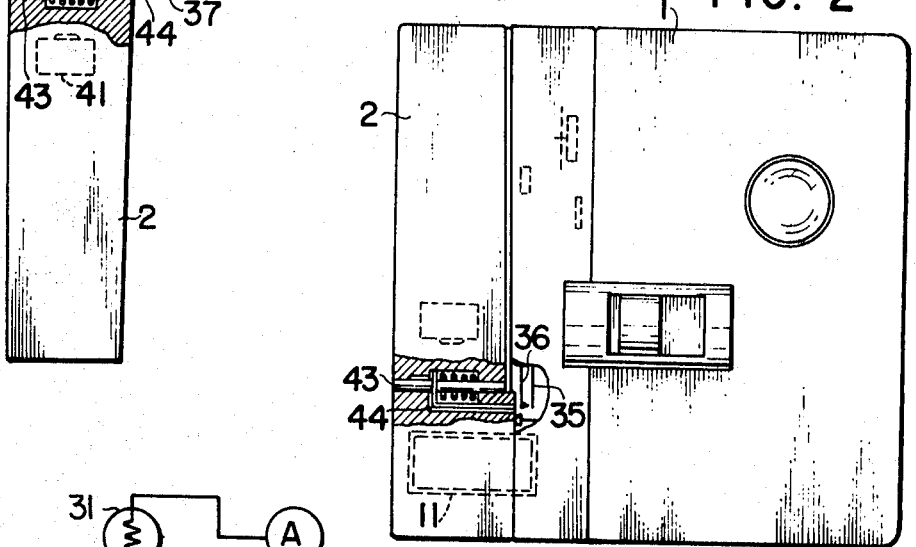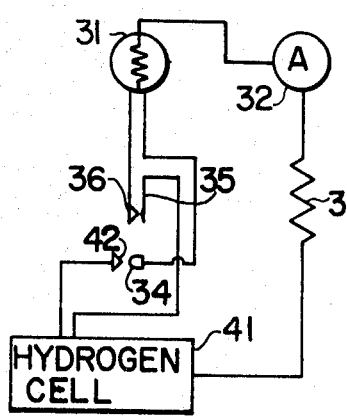

3,618,503
MOVIE CAMERA
Yoshizo Ikegami and Saichiro Ohashi, Nishinomiya-shi, Hyogo, Japan, assignors to Fuji Photo Film Co., Ltd., Minami-Ashigara-machi, Kanagawa, Japan
Filed Aug. 21, 1969, Ser. No. 851,916
Claims priority, application Japan, Aug. 23, 1968, 43/60,389
Int. Cl. G03b 17/04
U.S. Cl. 95—86                                        4 Claims

ABSTRACT OF THE DISCLOSURE

A rotatable grip is mounted on a camera body and carries an electrical contact to be brought into contact with a stationary contact on the camera body only when the grip is moved to extended picture taking position to close the electrical circuit of the automatic exposure control. Another movable contact is provided on the grip to be brought into contact with a second contact on the camera body only when the grip is moved to the retracted position to close an electrical circuit for checking the capacity of the storage cell in the camera.

BACKGROUND OF THE INVENTION

Field of the invention

The present invention relates to photographic camera, and more particularly to a camera having a rotatable grip coupled to the camera body.

Description of the prior art

In an automatic camera which includes an exposure control device utilizing a photoelectric element or the like, the electrical circuit connecting the element with an electrical source should be closed for as short a time as possible, primarily when the camera is used to take pictures, since the life of the photoelectric element and the electrical cell is limited. Also, the capacity of the cell left should be checked to see if sufficient capacity is still left in the cell before taking the picture.

SUMMARY OF THE INVENTION

The present invention provides a camera which has a roatatable grip to be moved to the closed or retracted position to make the camera compact and further provides a grip so related to electrical contacts to close or open electrical circuits in the camera in response to the rotation of the grip. The camera has a grip pivotally mounted on the camera body so as to be selectively positioned in the open or closed position, with the grip used as a lens cover in the closed or retracted position and as a camera holder in the open or extended position.

The camera uses the rotatable grip as a checking switch for checking the capacity left in the electrical cell in the camera when the grip is in the closed position. The present invention also provides a camera with a rotatable grip wherein a second electrical switch is closed in the case when the grip is in the open position to close an electrical circuit for the exposure control circuit of the camera.

BRIEF DESCRIPTION OF THE DRAWINGS

FIG. 1 is a side view, partly in section, of a movie camera with the grip in the open position.
FIG. 2 is a side view of the same, partly in section, with the grip in the closed position.
FIG. 3 is an explanatory schematic view of the electrical circuit of the camera in accordance with an embodiment of the present invention.

DETAILED DESCRIPTION OF THE PREFERRED EMBODIMENT

Referring to FIG. 1, a pivot 11 is provided at the lower portion of the front face 10 of the camera body 1, and a grip 2 is pivotally mounted to the pivot 11 at an end thereof. The grip 2 can be rotatable about the pivot 11 and is adapted to be set at at least two positions one of which is the closed or retracted position wherein grip 2 is in contact with the front face 10 of the camera body 1 as shown in FIG. 2 and the other open position wherein grip 2 is in the reverse of the closed position, that is extended and used to support the camera body 1.

In the embodiment shown in FIG. 1, a photoelectric element 31 such as CdS for controlling the exposure condition, an exposure meter 32 having a pointer and a resistor 33 are all disposed in the camera body 1. These electrical elements 31, 32, 33, are connected in series with a hydrogen cell 41 located in the grip 2 and connected thereto through a couple of contacts 34, 42. Contact 34 is provided on the camera body 1 and the other contact 42 is provided on the grip 2. The contacts 34, 42, are to be brought into contact with each other when the grip 2 is moved to the open or extended position. If the number of the contacts for connecting the elements 31, 32, 33, with the hydrogen cell 41 are increased, the grip positions where pictures are able to be taken can be increased.

The electrical circuits for automatic exposure control and for the cell checking may be separate or integrally formed. In the embodiment shown, the two circuits are integrally formed and the two switches for respective circuits are connected in parallel. The other switch consists of two contacts 35. Contact 36 is provided in the camera body 1 in parallel with contacts 34, 42. A shutter button 43 is provided on the grip 2 in such a position that the shutter button 43 is brought into alignment with a shutter release lever 37 in the camera body 1 when the grip 2 is in the open or extended position as shown in FIG. 1. In this case the rod 44 connected to the shutter button 43 when pushed by the shutter button 43 pushes the shutter release lever 37. When the grip 2 is in the closed or retracted position, the rod 44 of the shutter button 43 is at a position in alignment with the switch contacts 35, 36, as shown in FIG. 1, and the switch contacts 35, 36, are brought into contact with each other, that is the switch is closed, by pushing the shutter button. Thus, the capacity of the cell can be checked when the camera is not in a usable condition. If the cell still has enough capacity for operating the exposure control device, the meter 32 is actuated and the pointer thereof is moved, which can be easily seen from outside through a view finder or the like.

In the case that the switch contacts 35, 36, are connected in series with the photoelectric element 31 as shown in FIG. 3, the photoelectric element 31 should receive light even when the grip 2 is in the closed position. Therefore, the grip 2 should have the portion directly in front of the photoelectric element, transparent to let the light pass through. If the grip 2 is made of some opaque material, the circuit for checking the cell including the switch contacts 35, 36, should be constructed without the photoelectric element 31 but should have some proper resistor instead.

Though in the above description the contacts 42, 34, are provided on the grip 2 and the camera body 1 respectively, both contacts 42, 34, may be provided on either the grip 2 of the camera body 1 by providing a switch pin or lever and the like in operative relationship between the grip 2 and the camera body 1. Take a microswitch for instance, if a microswitch is provided in the camera body 1 and the actuator of the microswitch is constructed so as to be actuated in response to the rotation of the grip 2 into the open position thereof, the contacts 34, 42, will be brought into contact with each other.

In accordance with the present invention, the electrical circuit for the automatic exposure control is only used in the case where the grip 2 of the camera is in the open position and no electrical current flows when the camera is not being used, whereby the life of the photoelectric element is extended and the loss of electricity from the cell is also prevented.

In accordance with the present invention, the capacity of electrical charge left in the cell can be checked by pushing the shutter button. Since it is not required to provide a separate checking button for this check, the construction of the camera itself is simplified and the camera can be manufactured at low cost.

What we claim is:

1. In a camera including a camera body housing an exposure meter, and an electrical circuit for energizing said exposure meter, the improvement comprising: a grip movably mounted on said camera body so as to be selectively set in at least two positions, one of which is a retracted position where said grip overlies the front face of said camera body, and the other is an extended position where said grip exposes the front face of said camera body, and a switch for closing said electrical circuit which is closed in response to movement of said grip to said extended position.

2. The camera as defined in claim 1 wherein said switch consists of a pair of contacts, one of which is provided on said camera body and the other of which is provided on said grip.

3. The camera as defined in claim 1 further comprising a shutter button provided on said grip, a second switch provided on said camera body at a position where said second switch may be actuated by said shutter button when said grip is in the retracted position, an electrical current indicating means connected with said second switch, and an electrical source connected in series with said second switch and said current indicating means.

4. A camera as defined in claim 3 wherein said second switch, current indicating means and said electrical source are included in said electrical circuit for energizing said exposure meter.

References Cited

UNITED STATES PATENTS

| | | | |
|---|---|---|---|
| 3,508,482 | 4/1970 | Taylor | 352—243 X |
| 3,519,341 | 7/1970 | Dudley | 95—86 |

SAMUEL S. MATTHEWS, Primary Examiner

E. M. BERO, Assistant Examiner